April 29, 1958     W. T. DE CAPUA     2,832,638
WINDSHIELD CONSTRUCTION FOR VEHICLES
Filed Feb. 1, 1956     2 Sheets-Sheet 2
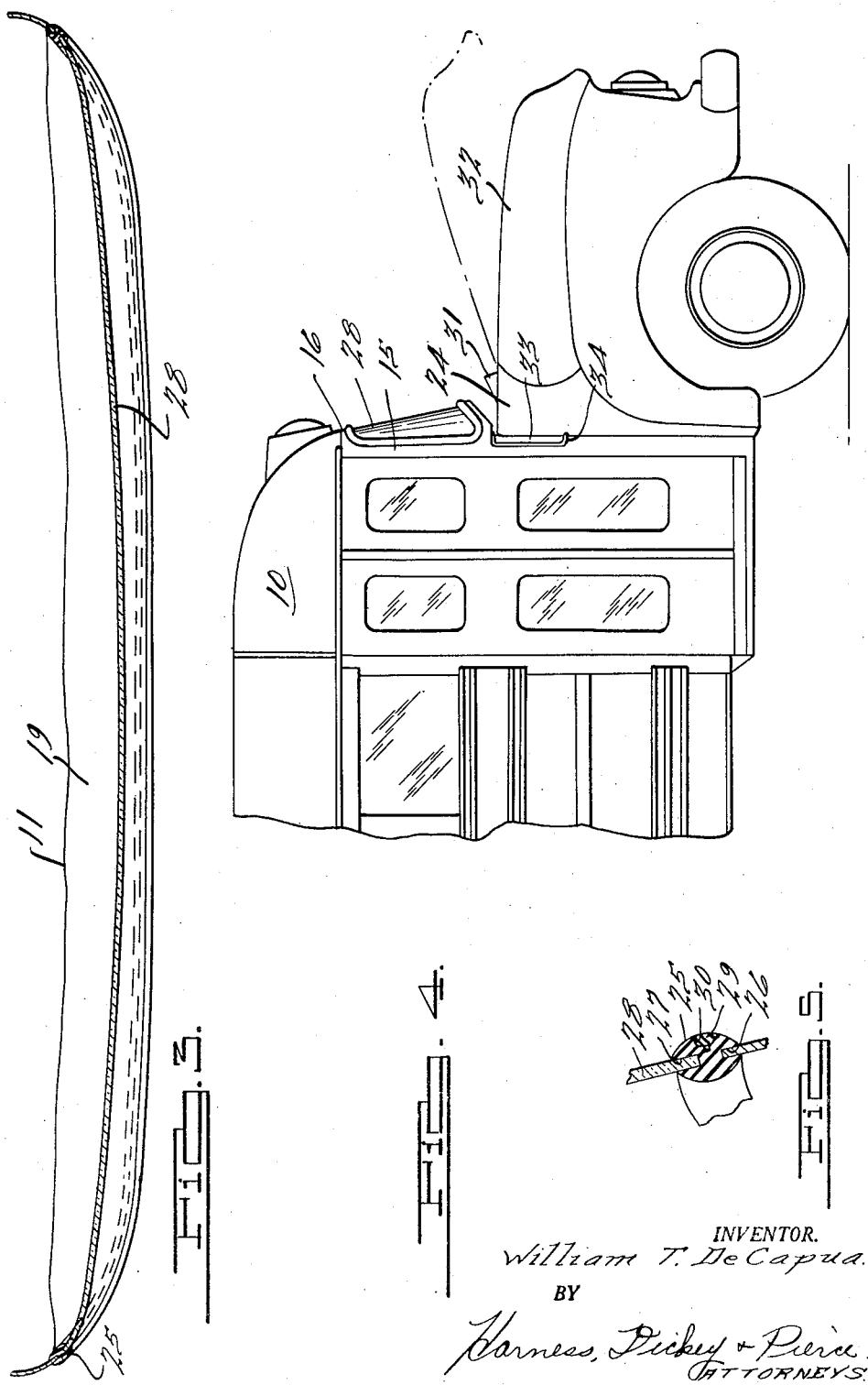
INVENTOR.
William T. De Capua.
BY
Harness, Dickey & Pierce
ATTORNEYS.

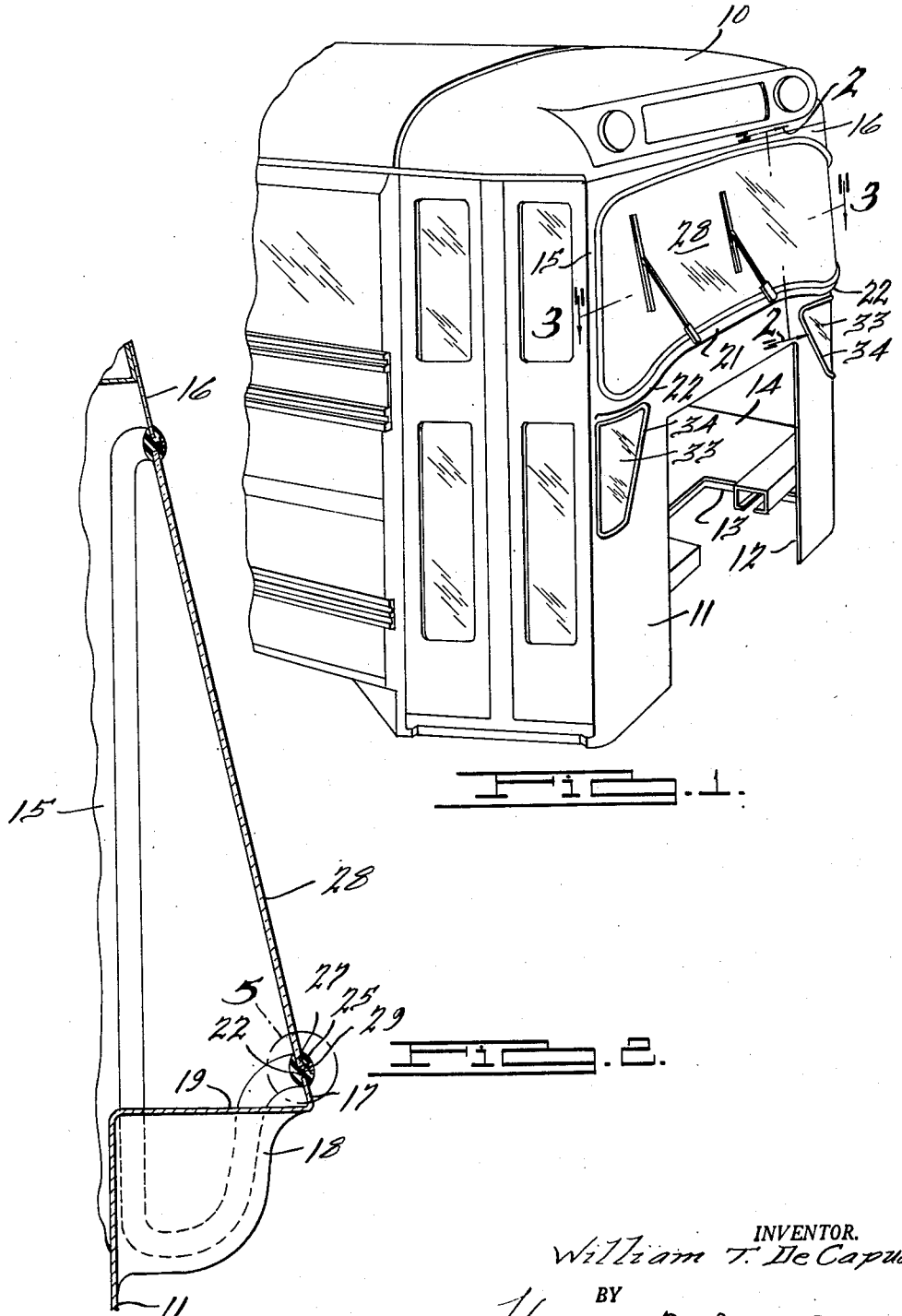

United States Patent Office 2,832,638
Patented Apr. 29, 1958

2,832,638

WINDSHIELD CONSTRUCTION FOR VEHICLES

William T. De Capua, Richmond, Ind., assignor to Wayne Works, Inc., Richmond, Ind., a corporation of Illinois Application February 1, 1956, Serial No. 562,790

3 Claims. (Cl. 296—84)

This invention relates to vehicles, and particularly to the windshield construction at the front end of a vehicle.

It has been the practice in the art to purchase chassis frames including the cowl panel and hood construction and to construct the body as a separate element which is mounted thereon. This permits the manufacturer of the body to sell a complete vehicle.

The present invention pertains to a body having a wrap-around windshield thereon which is extended forwardly over the cowl panel so as to retain a full length of the body rearwardly of the chassis panel. The wrap-around windshield extends downwardly at the corners and increases the visibility for the driver without losing any of the usable space of the chassis frame rearwardly of the hood and cowl panel. Additional windows are provided below the corners of the windshield to provide visibility to the ground adjacent to the door opening.

Accordingly, the main objects of the invention are: to provide a bus body with a wrap-around windshield which overhangs the cowl panel; to form a wrap-around windshield on a vehicle by extending a panel at the bottom of the windshield opening forwardly of the cowl of the vehicle and supporting a wrap-around windshield at the marginal edge of the overhanging panel which extends downwardly at the corner to increase visibility; to extend the bottom of the windshield opening forwardly of the front face of a bus body to form a support for a wrap-around windshield; to provide windows in the front corners of the body below the corners of the windshield to increase ground visibility adjacent to the door openings, and, in general, to provide a vehicle body with a wrap-around windshield without losing any of the usable area of a chassis frame, all of which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a perspective view of the front end portion of a bus body having a wrap-around windshield embodying features of the present invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fif. 4 is a side view of the structure illustrated in Fig. 1 when assembled upon a chassis frame, and Fig. 5 is an enlarged view in section of the supporting strip for the windshield as shown in the circle 5 of Fig. 2.

The vehicle body of the present invention, shown as a bus for the purpose of illustration, is of standard construction except for the windshield portion which has been altered to support a windshield of the wrap-around type. The body 10 has a front panel 11 containing an opening 12 therein through which the rear portion of the engine and transmission extends when positioned within an aperture 13 in the floor 14 of the body. The A pillars 15 at the sides of the body are disposed in vertical position, with the header panel 16 sloping in the plane of a flange 17 on the forward edge of a panel 18 which extends forwardly of the panel 11 at the bottom of the windshield opening. The panel 18 may be a separate element which is welded or otherwise secured to the panel 11 or may be a portion of the panel 11 which is drawn outwardly to form the forwardly extending shelf 19 having the edge flange 17. The central portion 21 of the shelf 19 is offset upwardly from the side portions 22 thereof to clear the arcuately shaped cowl panel 24 of the chassis frame. As is evident from Fig. 4, the shelf 19 extends forwardly of the panel 11 and over the cowl panel 24 so as to support the wrap-around windshield without any loss of space rearwardly of the cowl panel 24. The flange 17 extends around the shelf 19 in continuation of a flange on the pillars 15 and the edge of the header panel 16, all of which forms a support for a molding strip 25 of rubber or similar resilient material. The flange 17 and the continuation thereof formed by the edges of the metal of the pillar 15 and header panel 16 defining the windshield opening, project into an outer slot 26 in the supporting strip 25 while the edge of a wrap-around windshield 28 projects into an inner slot 27. After the supporting strip 25 secures the windshield 28 within the opening, the locking strip 29 is then placed in a slot 30 in the strip 25 for locking the strip against separation from the flanged edges of the opening and the windshield against separation from the strip. With the windshield constructed in this manner, the body is then placed upon and secured to the chassis frame in the usual manner, with the panel 11 abutting the rear of the cowl panel 24. The cowl panel is directly beneath the overhanging windshield, separated therefrom sufficiently to permit a ventilator 31 to be opened and the hood 32 to be raised without interference.

Below the downward overhanging corners of the windshield arcuate windows 33 are provided in the arcuate corners at the front of the body. These windows increase the ground visibility adjacent to the door openings providing increased safety for the driver of the vehicle. The glass of the window is retained in the opening by a securing strip 34 which is similar to the strip 25 that supports the windshield.

What is claimed is:

1. A vehicle body having a flat front panel portion below the windshield opening for abutting the rear portion of a forward housing of a chassis frame, a shelf extending forwardly of the front panel portion to form the bottom of the windshield opening, a wrap-around windshield, and means securing the windshield to the edge of said shelf and the marginal edges of the opening at the sides and top thereof.

2. A vehicle body having a flat front panel below the windshield opening for abutting the rear wall of a cowl panel of a chassis frame, a shelf extending forwardly of the front panel at the bottom of the windshield opening, an upwardly extending sloping flange at the edges of the shelf, a header panel sloping in a plane of the flange and having a flange at the edge in continuation of flanges at the sides of the opening and at the edges of the shelf, and a wrap-around windshield supported by said continuous flange, said supporting means embodying a strip of flexible material having slots on opposite sides thereof one of which receives the marginal edge of the windshield, the other of which receives the marginal flange defining the opening.

3. The combination with a chassis frame having an engine compartment at its forward end, a body for said chassis frame having a front panel containing a windshield opening, a shelf-like element projecting forwardly of the front panel at the bottom of the opening to define a forwardly extending supporting edge for a windshield, a wrap-around downwardly and forwardly sloping windshield for said opening, and means securing the edges of the windshield to the edges of the opening in a manner to have the bottom of the windshield extend forwardly of the front panel so as to project over the rear portion of said compartment when the body is mounted on the chassis frame.

References Cited in the file of this patent

UNITED STATES PATENTS

| | | |
|---|---|---|
| D. 92,848 | Kepperley | July 24, 1934 |
| D. 160,059 | Boca | Sept. 12, 1950 |
| 1,609,727 | Knapp | Dec. 7, 1926 |
| 1,961,352 | Hall | June 5, 1934 |
| 2,137,323 | Wallach | Nov. 22, 1938 |
| 2,186,689 | Wendt | Jan. 9, 1940 |
| 2,189,138 | Eichner | Feb. 6, 1940 |
| 2,620,221 | Romano | Dec. 2, 1952 |
| 2,707,031 | Williams | Apr. 26, 1955 |

FOREIGN PATENTS

| | | |
|---|---|---|
| 1,084,638 | France | Jan. 21, 1955 |